US010894597B2

(12) United States Patent
Persico

(10) Patent No.: US 10,894,597 B2
(45) Date of Patent: Jan. 19, 2021

(54) AIRCRAFT LANDING GEAR ASSEMBLY WITH ELECTROMECHANICAL ACTUATION AND AIRCRAFT PROVIDED WITH SUCH ASSEMBLY

(71) Applicant: MAGNAGHI AERONAUTICA S.P.A., Naples (IT)

(72) Inventor: Pietro Persico, Naples (IT)

(73) Assignee: MAGNAGHI AERONAUTICA S.P.A., Naples (IT)

(*) Notice: Subject to any disclaimer, the term of this patent is extended or adjusted under 35 U.S.C. 154(b) by 292 days.

(21) Appl. No.: 16/094,703

(22) PCT Filed: Apr. 19, 2017

(86) PCT No.: PCT/IB2017/052226
§ 371 (c)(1),
(2) Date: Oct. 18, 2018

(87) PCT Pub. No.: WO2017/182955
PCT Pub. Date: Oct. 26, 2017

(65) Prior Publication Data
US 2019/0112036 A1  Apr. 18, 2019

(30) Foreign Application Priority Data
Apr. 19, 2016 (IT) .................. 102016000040149

(51) Int. Cl.
*B64C 25/26* (2006.01)
*B64C 25/24* (2006.01)
(Continued)

(52) U.S. Cl.
CPC .............. *B64C 25/26* (2013.01); *B64C 25/24* (2013.01); *B64C 25/34* (2013.01); *B64C 2025/325* (2013.01)

(58) Field of Classification Search
CPC ......... B64C 25/26; B64C 25/28; B64C 25/30; B64C 25/02; B64C 25/04; B64C 25/10;
(Continued)

(56) References Cited

U.S. PATENT DOCUMENTS

2009/0314884 A1   12/2009  Elliott et al.
2012/0037752 A1*  2/2012  Collins .................. B64C 25/26
                                                          244/102 SL
(Continued)

FOREIGN PATENT DOCUMENTS

CN    203111497 U    8/2013
EP      2319760 A1   5/2011
EP      2386487 A2   11/2011

*Primary Examiner* — Joshua J Michener
*Assistant Examiner* — Cindi M Curry
(74) *Attorney, Agent, or Firm* — Volpe Koenig

(57) ABSTRACT

A landing gear assembly, having an electromechanical device for actuating the landing gear and locking and releasing device, includes: a rotary actuator acting on the assembly at the hinge point, having a rotary electric motor connected to an actuating arm, to rotate the assembly around a respective actuation axis with an interconnection so that, in case of power supply failure, the actuator is free to rotate dragged by the assembly by free fall; and a linear actuator, integral to the assembly and movable therewith, and which includes a rotary electric motor and a cam mechanism to transform rotary motion of the motor into an axial motion of a locking pin. The actuation axes of the rotary actuator and of the linear actuator are parallel, and the rotation axis of the rotary electric motor of the linear actuator coincides with the linear actuation axis of the locking pin.

7 Claims, 7 Drawing Sheets

(51) Int. Cl.
*B64C 25/32* (2006.01)
*B64C 25/34* (2006.01)

(58) Field of Classification Search
CPC ......... B64C 25/12; B64C 25/14; B64C 25/18; B64C 25/20; B64C 2020/125; B64C 25/44

See application file for complete search history.

(56) References Cited

U.S. PATENT DOCUMENTS

| | | |
|---|---|---|
| 2013/0092482 A1 | 4/2013 | Keller et al. |
| 2013/0147210 A1 | 6/2013 | Dufay et al. |
| 2013/0181091 A1 | 7/2013 | Evans et al. |
| 2013/0299633 A1 | 11/2013 | Tierney et al. |

\* cited by examiner

AIRCRAFT LANDING GEAR ASSEMBLY WITH ELECTROMECHANICAL ACTUATION AND AIRCRAFT PROVIDED WITH SUCH ASSEMBLY

The present invention relates to an aircraft landing gear system assembly, in particular for helicopters, provided with devices actuating from retracted position to extended position and vice versa, and with devices for locking and releasing in and from said positions. The invention also relates to an aircraft, in particular a helicopter preferably but not exclusively having a weight not higher than 5,000.00 Kg, equipped with such landing gear assembly.

In the aeronautical field, the actuation of the aerodynamic control surfaces of the fixed-wing and rotary wing aircrafts and of the on-board critical auxiliary systems, such as for examples the landing gears, conventionally is implemented by using hydraulic actuators and high pressure fluid systems, which allow to exploit the high hydraulic power to obtain advantageous and effective performances.

However, the weight of the pressure systems, providing pumps, hydraulic pipes, a fluid for the power transmission and so on, becomes considerable above all in the light aircrafts, to the expense of the net weight thereof.

Furthermore, in particular in the light aircrafts, the pressure systems do not represent the safest solution, unless expensive and heavy redundancies.

At last, the oil which is used as pressure fluid have environmental problems for the production thereof and for the subsequent disposal thereof.

The European patent application No. EP 2,319,760 describes a landing gear system with a linear actuation locking device.

The technical problem underlying the present invention is to provide a landing gear system for aircrafts allowing to obviate the drawback mentioned with reference to the known art.

Such problem is solved by a landing gear system as specified above and defined in the enclosed claim 1. Additional details are defined in the depending claims.

The main advantage of the landing gear assembly according to the present invention lies in the fact of allowing to eliminate the hydraulic circuits related to the landing gear actuation, especially in the helicopter field wherein the hydraulic apparatuses are often used only for this actuation, and to keep the maximum compactness.

The present invention will be described hereinafter according to a preferred application example thereof, provided by way of example and not with limitative purposes with reference to the enclosed drawings wherein.

Figure 1:
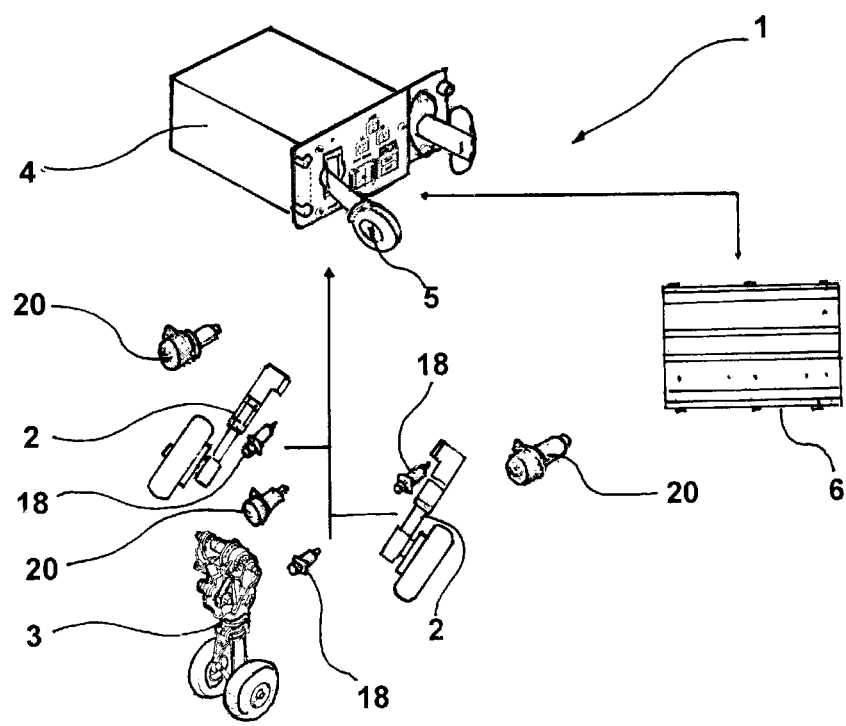
FIG. 1 shows a schematic overall view illustrating the composition of the landing gear arrangement of an aircraft.

By referring to FIG. 1, a landing gear arrangement, in particular of a helicopter having a weight not higher than 5,000.0 Kg, is designated as a whole with 1. Under landing gear arrangement, the set of the single landing gears sustaining an aircraft on the ground is meant; it is represented without the respective aircraft, which however makes available the electric power required for the operation of the landing gear arrangement and a frame thereto the landing gear arrangement is associated in a substantially conventional way, so as to not require a specific illustration.

In this example, the landing gear arrangement is of tricycle-like type, with a front steering landing gear and a pair of main landing gears on the sides of the aircraft. All landing gears are retractable: they can be moved from a retracted configuration to an extended configuration and vice versa. The retracted configuration is used during the aircraft flight, whereas the extended configuration is adopted by the landing gears in the landing phase and it is kept on the ground.

The landing gear arrangement 1 then comprises a pair of main landing gears 2 (see FIGS. 2 to 4 and 8), arranged at the sides of the aircraft on the right and on the left, and a double-wheeled front landing gear 3 (see FIGS. 5 to 7 and 9), arranged near the aircraft nose; the landing gears 2 and 3 are equipped with respective extension and retraction electromechanical actuators for moving the landing gear from a retracted position to an extended position and vice versa, one for each landing gear, and electromechanical actuators for locking/releasing in the extended or retracted positions of the landing gears.

Since the actuators are of electromechanical type, they are supplied with electric current directly provided by the aircraft. In case of power supply interruption, for example due to a failure, if the landing gears 2, 3 are in retracted position, as it happens during the flight, they should be able to pass to the extended configuration by fall, to allow the aircraft to land on the landing gears' wheels.

The front landing gear 3 is even equipped with the capability of self-centering and steering freely, controlled by a locking system actuated electrically by the drivers in cabin for taxiing on the runway or manually by the operators on the ground during dragging and/or maintenance manoeuvres.

The landing gear arrangement is equipped with an electronic control system for actuating and controlling the functions of releasing/locking/extending/retracting the landing gears 2, 3, constituted by a control panel 4 with actuation lever 5 and by an electronic control module 6.

The control panel 4 of the landing gear arrangement is in the cabin and it is manoeuvred manually by a driver to actuate the legs of the landing gear system, apart from providing weight indications about the landing gears' wheels.

The lever 5 of the control panel has two Up and Down positions for retracting and extending the landing gear, respectively.

The main components are:
a mechanic control lever for controlling the landing gear positions;
a button with integrated lights for controlling the emergency;
a button with the integrated lights for controlling the mechanism for locking the front landing gear;
three warnings indicating the status of each one of the landing gears;
a lever of the parking brake; and
two printed circuits for the logical indication;
a mechanism for locking the lever in order not to bring it in Up position when the landing gear is on the ground.

The panel 4 controls two actuation systems, the normal extension and retraction one and the emergency extension in case of failure.

The green lights on the panel are active when the landing gear is extended and locked and the lever is in stretched, or lowered, position.

The yellow lights are turned on in the transition phase from up to down and from down to up and then during the extension phase and the retraction one.

During flight, when the landing gear is retracted and locked, the lights are turned off.

The emergency indicator lights are turned on to show emergency procedures.

A center lock indicator light is suitably turned on depending upon the landing gear is locked, fitted out or released.

The indicator lights are controlled by the panel inner logic combining the lever position and the signals of the system sensors reaching the control panel.

The control module 6 actuates the electric actuators for the extension and retraction according to the controls received by the panel under normal or emergency condition.

The portion controlling the normal operating mode is constituted by three identical separated cards, each one thereof controls one landing gear leg, whereas the emergency one is constituted by one single card. The emergency card functionality is controlled continuously by means of a status bit.

Figure 2:
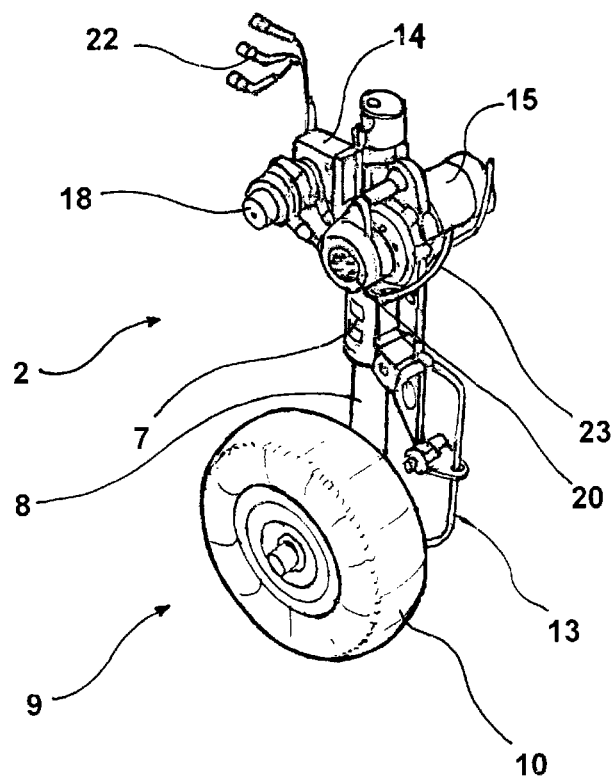
FIG. 2 shows an axonometric view of a main landing gear constructed based upon the landing gear assembly of the present invention.
Figure 3:
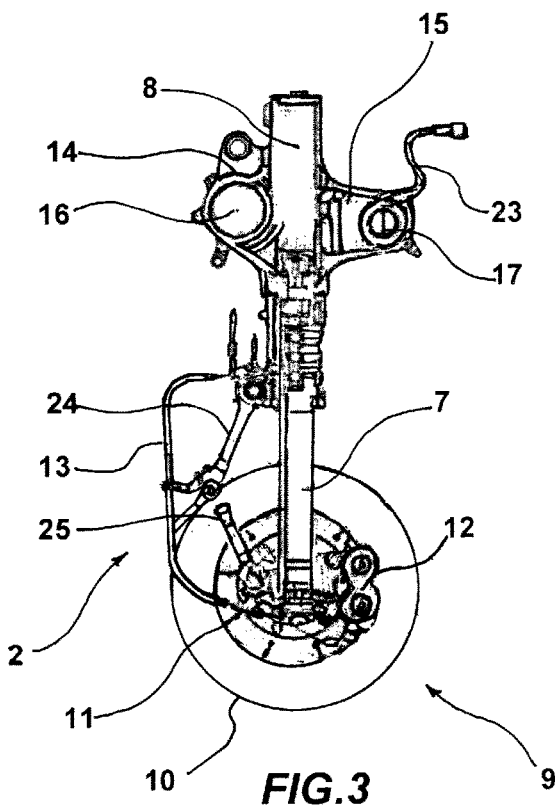
FIG. 3 shows a side view of the main landing gear of FIG. 2.
Figure 4:
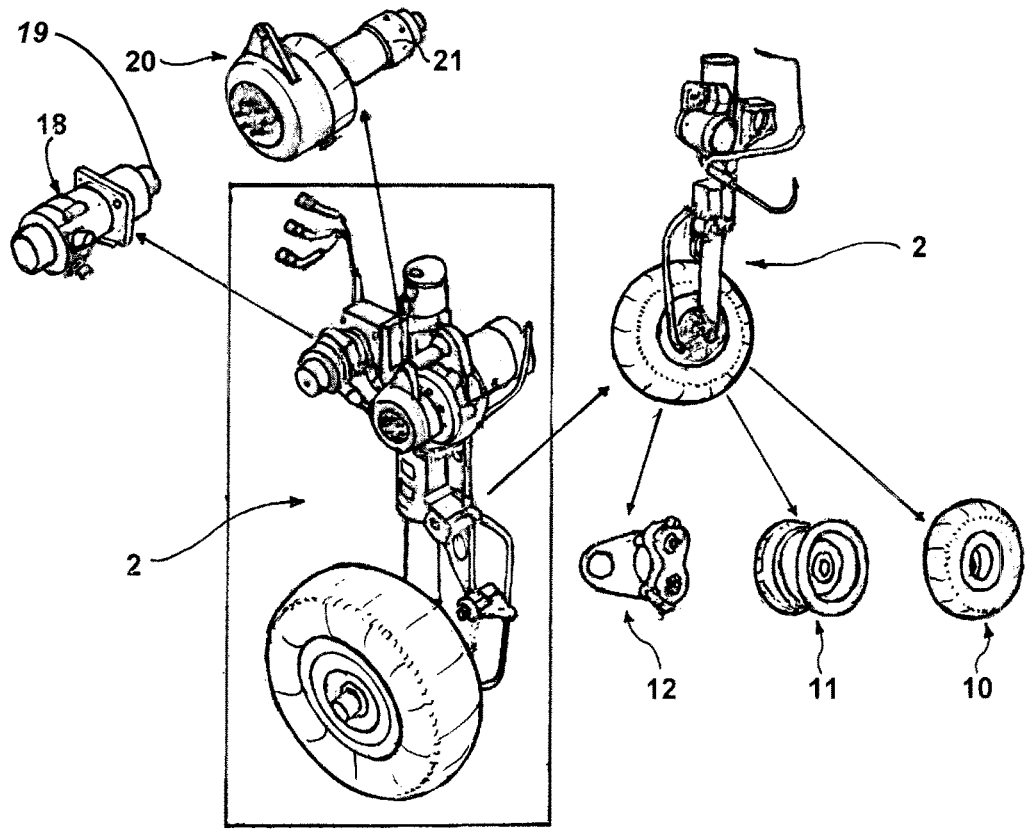
FIG. 4 shows a exploded overall view of the main landing gear of FIG. 2.

By referring to FIGS. 2 to 4, the main landing gears 2 are installed to the aircraft by means of hinge points allowing even the rotation thereof in the extension and retraction manoeuvres.

The landing gear 2, inside a structural portion thereof, integrates the shock absorber for the function of absorbing the main power which it has to fulfil during the manoeuvres for landing and moving on the ground.

On this regard, it comprises a first cylinder 7, connected to the frame by means of said hinge point, wherein a first supporting rod 8 is inserted, at the foot thereof a first not steering wheel 9 is revolvingly connected, provided with a suitable tyre 10 inflated with nitrogen, a rim and a disc brake 11 with the related tweezers 12, controlled by a suitable hydraulic circuit 13. The cylinder system 7 and supporting rod 8 constitute said shock absorber, of oleo-pneumatic or hydraulic type, the cylinder 7 receiving inside thereof an oil chamber of conventional type.

The main landing gear 2, in particular the cylinder thereof 7, has a pair of first opposite extensions, designated with 14 and 15, forming one single piece with the cylinder 7. Such first extensions 14, 15, extending on one single plane parallel to the plane of the first wheel 9, have respective first and second assembly holes 16 and 17 which receive a corresponding actuator of the main landing gear 2.

In particular, the first assembly hole 16 receives a first locking and releasing electric linear actuator 18, provided with a retractable locking pin 19. The second assembly hole 17, instead, receives a first electric rotary actuator 20, provided with a rotary electric motor 21 which provides the axis of the hinge point thereto the landing gear is connected.

The retractable locking pin 19 extends and retracts along the actuation axis thereof, to insert, when the landing gear is in retracted configuration, into a (not represented) sustaining seat, implemented in the aircraft hull.

Figure 8:
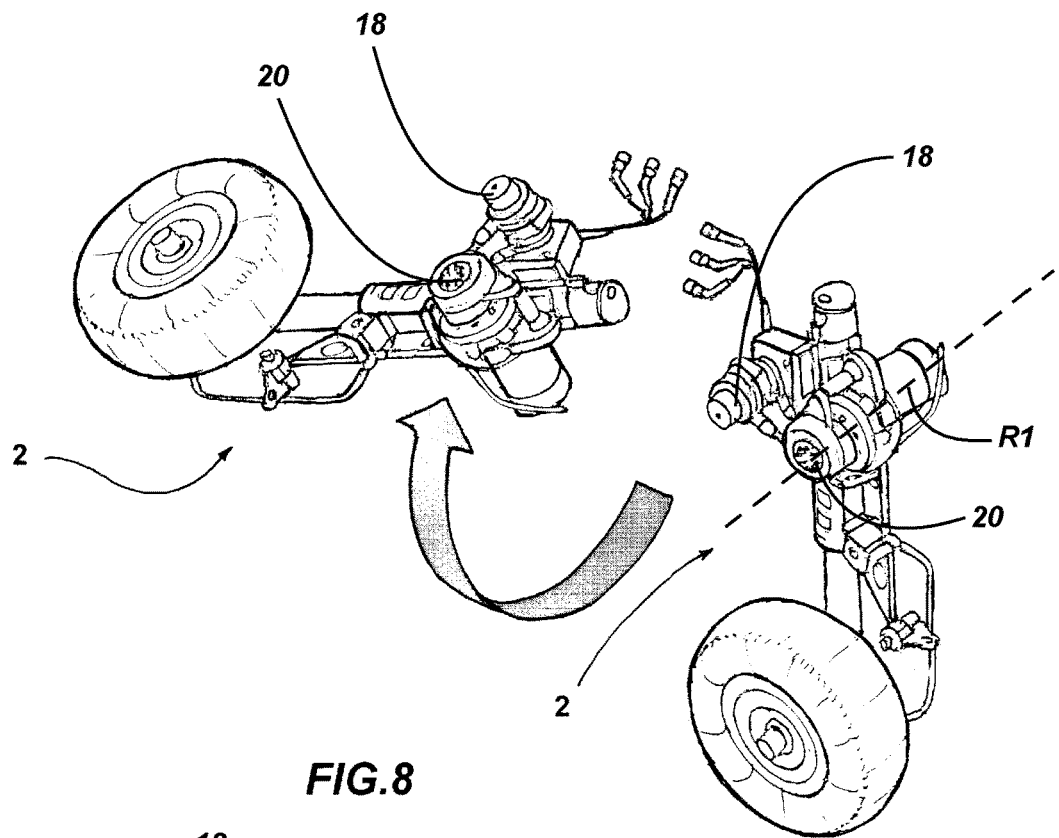
FIG. 8 shows a view illustrating the motion of the main landing gear of FIG. 2.

The actuation axes of both above-mentioned actuators 18, 20 are perpendicular to the plane defined by said first wheel 9. The actuation axis of the first rotary actuator 20 is also the rotation axis R1 of the rear landing gear (FIG. 8).

The two above-mentioned actuators 18, 20 are equipped with respective electric circuits 22, 23 thereby they are supplied with electric current.

The hub of the first wheel 9 and the cylinder 7 are also connected by a pair of upper 24 and lower 25 articulated levers, providing support to the circuits 13 of the disc brake 14.

Figure 5:
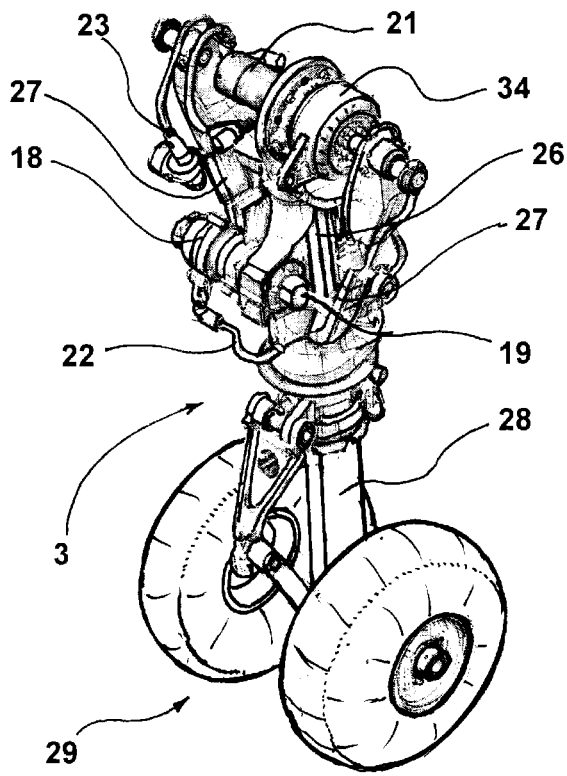
FIG. 5 shows an axonometric view of a front landing gear constructed based upon the landing gear assembly of the present invention.
Figure 6:
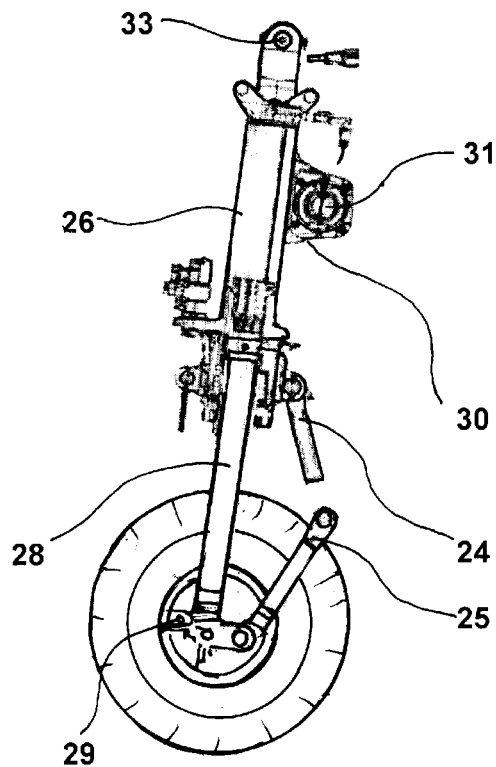
FIG. 6 shows a side view of the front landing gear of FIG. 5.
Figure 7:
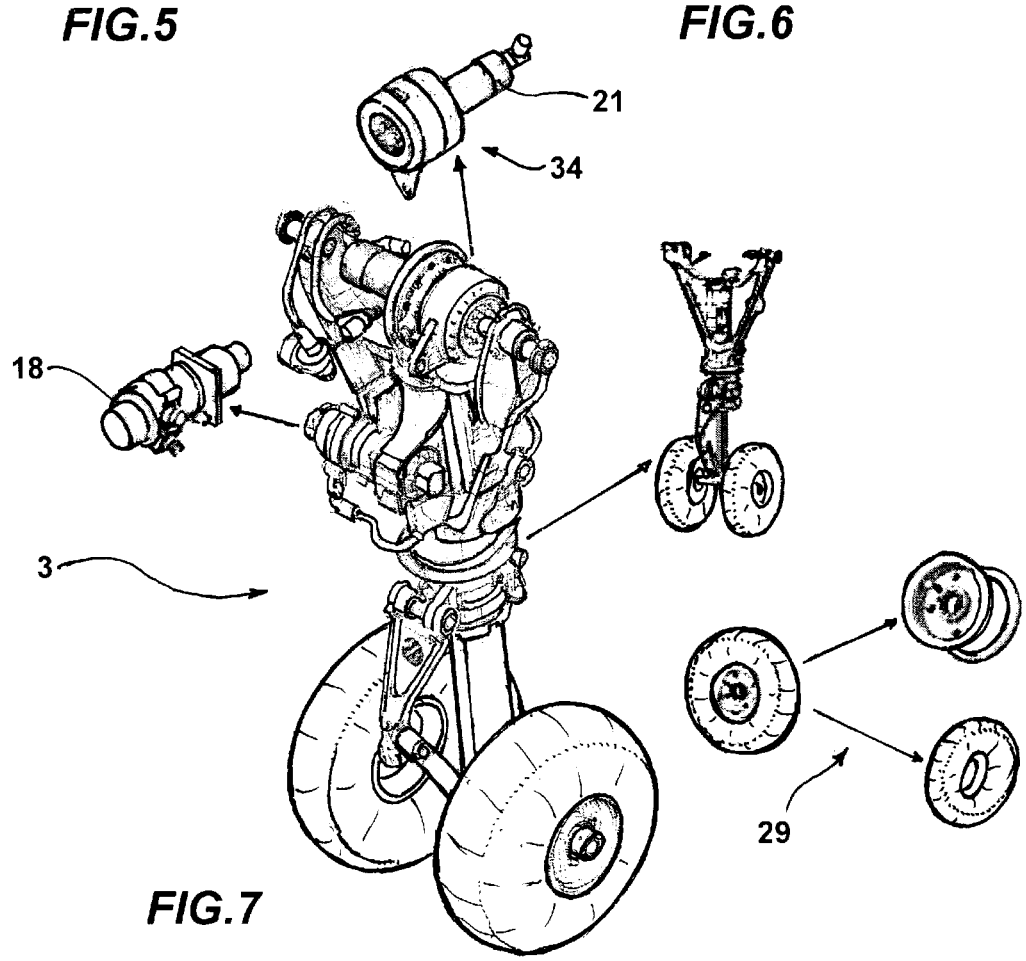
FIG. 7 shows a exploded overall view of the front landing gear of FIG. 5.

By referring to FIGS. 5 to 7, a front landing gear 3 is installed to the aircraft by means of hinge points which allow even the rotation thereof around a vertical axis, in the extension and retraction manoeuvres.

Even the front landing gear 3, inside a structural portion thereof, integrates the shock absorber for the function of absorbing the main power which it has to fulfil during the manoeuvres for landing and moving on the ground.

The front landing gear 3 then has a second cylinder 26, connected to the frame by means of the respective hinge point with the cooperation of a pair of side arms 27; in the second cylinder 26 a second supporting rod 28 is inserted, at the foot thereof a pair of steering wheels 29 is revolvingly connected, each one provided with a suitable tyre 10 inflated with nitrogen. Even the second cylinder system 26 and second supporting rod 28 constitute a shock absorber, of hydraulic type.

The front landing gear 3, in particular the cylinder thereof 26, has a third extension 30, forming one single piece with the cylinder 26 and extending on a plane parallel to the plane of the wheels 29 when they are oriented in forward motion (non-steered). It has a third assembly hole 31 which receives a corresponding second electric linear actuator of the front landing gear 3, identical to the previous one and designated with the same reference numeral 18, provided with a retractable locking pin 19.

The retractable locking pin 19 extends and retracts along its own actuation axis, to insert, when the landing gear is in retracted configuration, into a (not represented) sustaining seat, implemented in the aircraft hull.

On a proximal end of the second cylinder 25, at said arms 27 and the corresponding hinge point, the front landing gear 3 has a fourth assembly hole 33 receiving instead a second electric rotary actuator 34, provided with a rotary electric motor 21 which constitutes the axis of the hinge point thereto the front landing gear is connected.

The actuation axes of both above-mentioned actuators 18, are perpendicular to the plane defined by said steering wheels 29, when oriented in forward motion (not steered).

Figure 9:
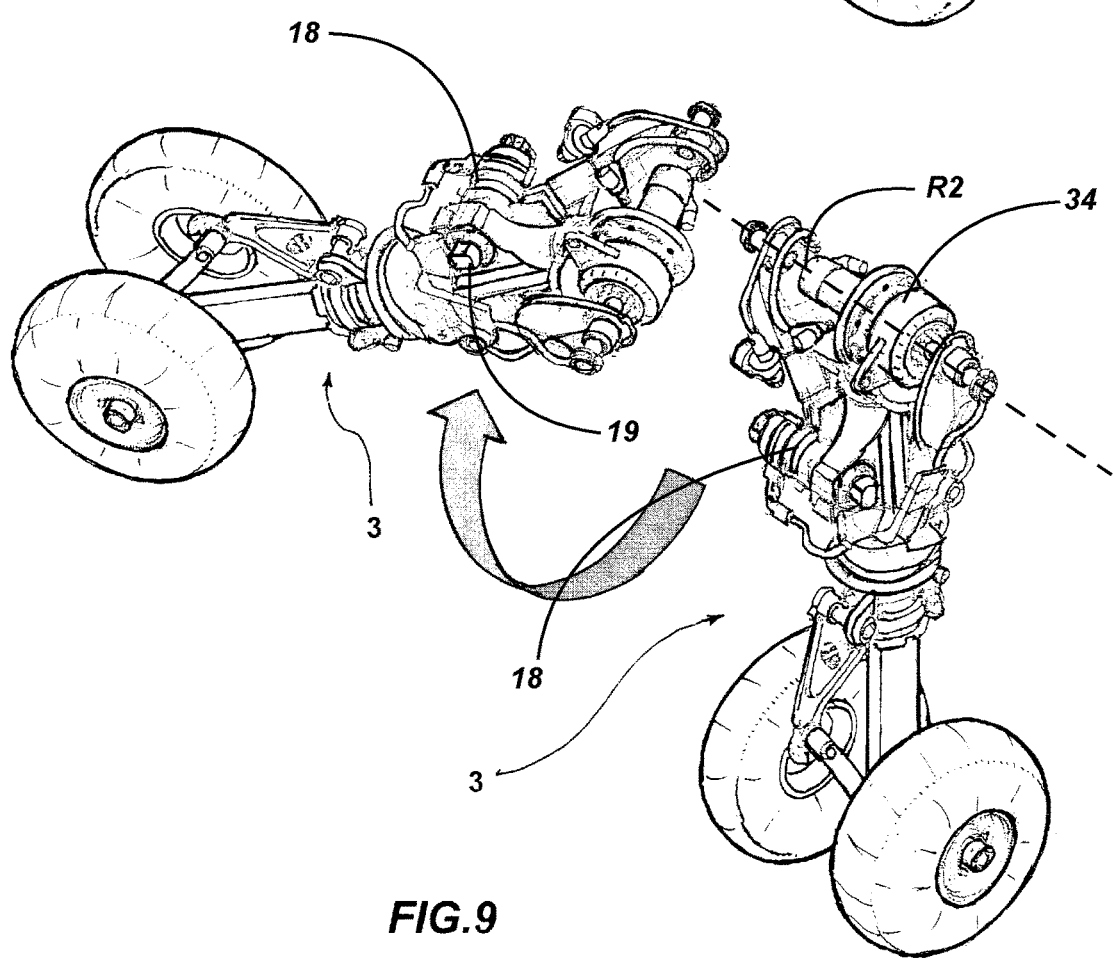
FIG. 9 shows a view illustrating the motion of the front landing gear of FIG. 5.
Figure 10A:
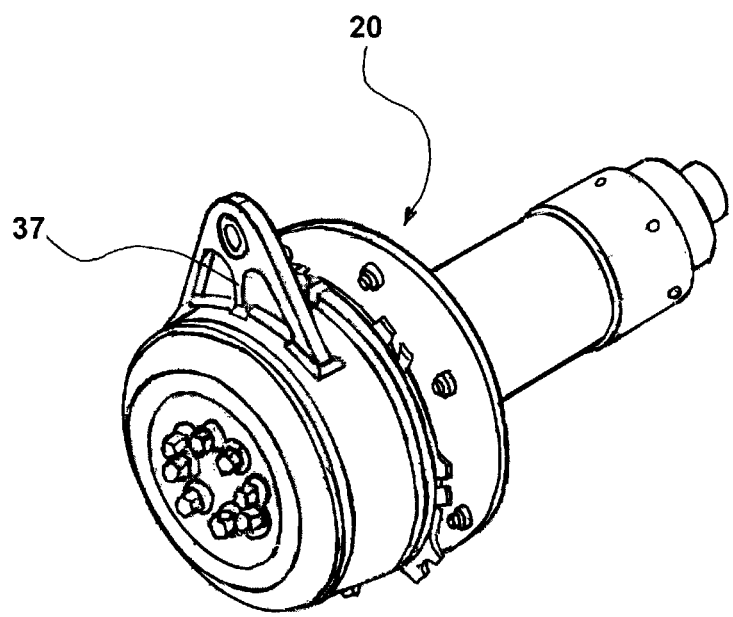
FIGS. 10A and 10B show an axonometric view of the electric actuators responsible for moving the main landing gear of FIG. 2 and of the front landing gear of FIG. 5, respectively.
Figure 10B:
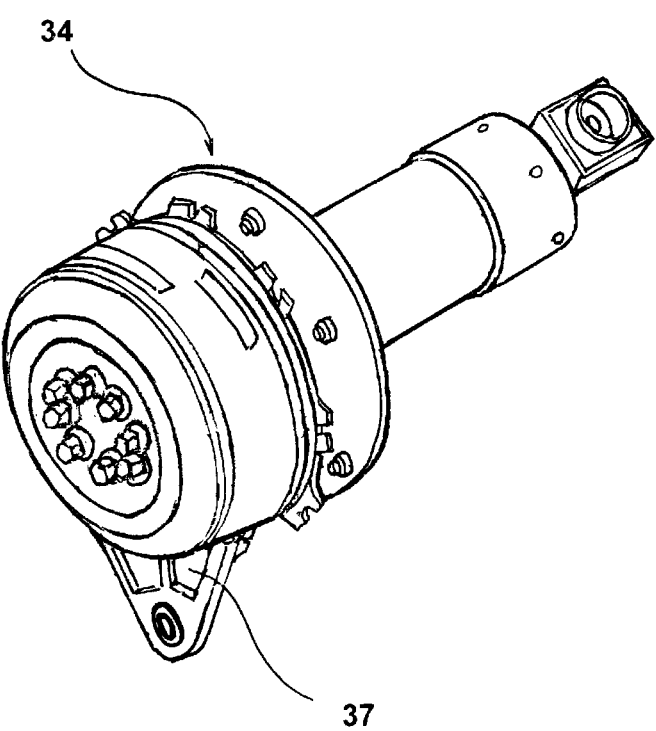
Figure 11:
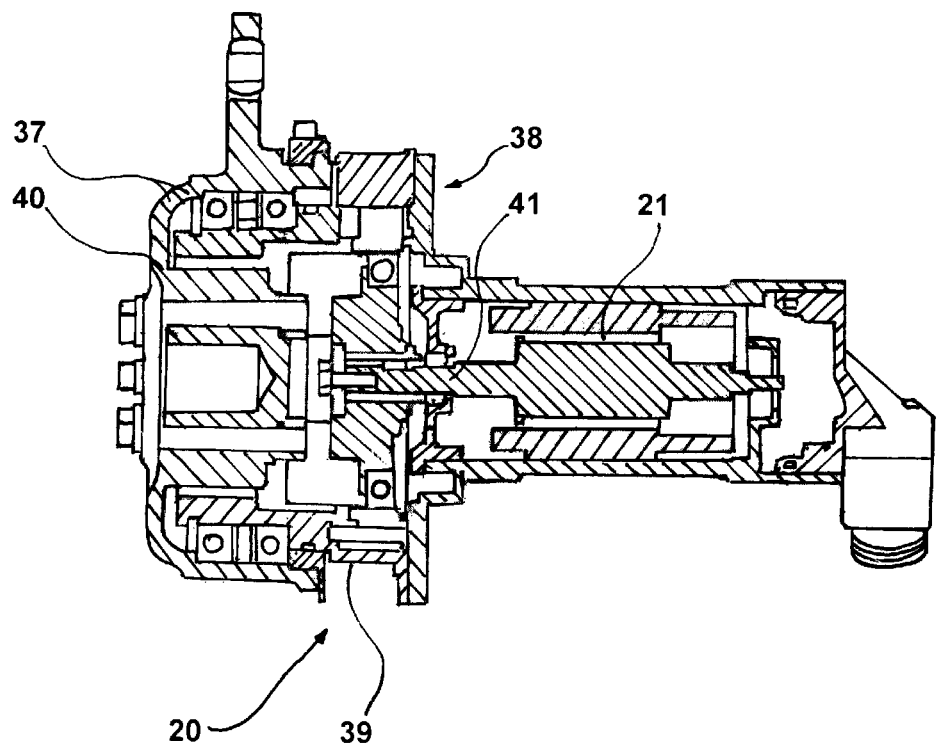
FIG. 11 shows a view in longitudinal section of the first actuator of FIG. 10A.
Figure 12:
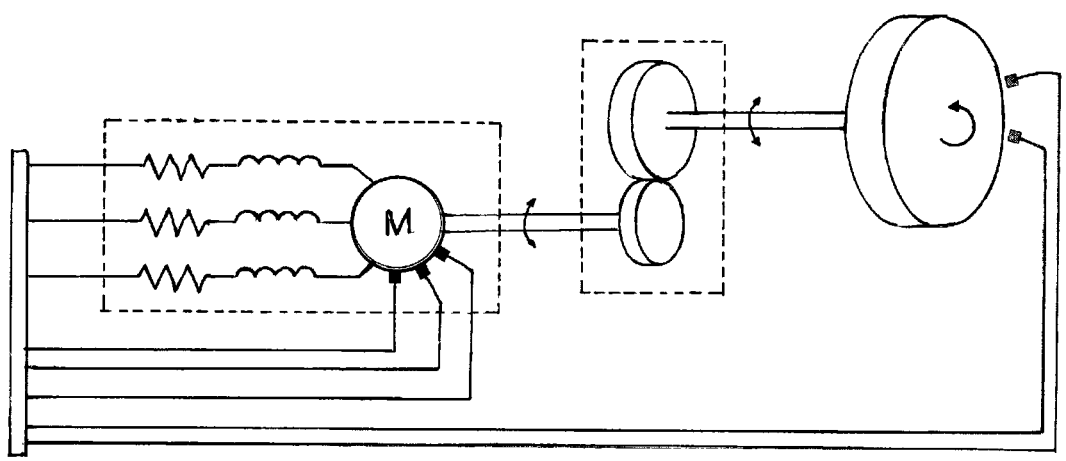
FIG. 12 illustrates schematically the electric circuits of the actuators of FIG. 10A or 10B.
Figure 13:
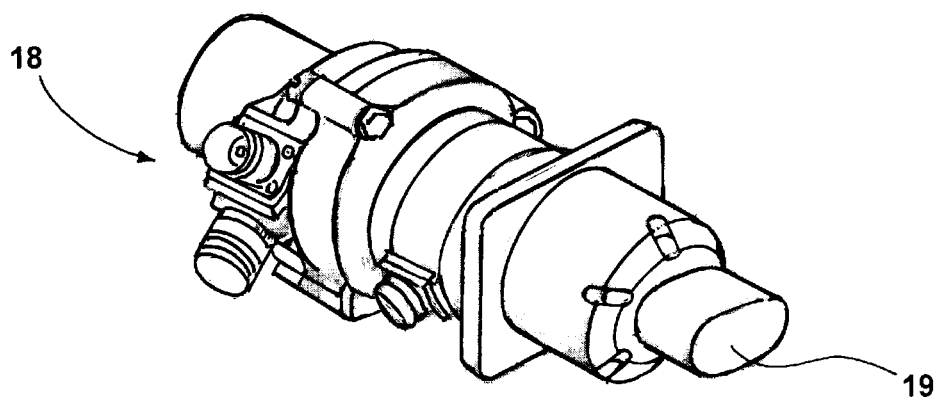
FIG. 13 shows an axonometric view of an actuator for locking/releasing one of the landing gears of the preceding figures.
Figure 14:
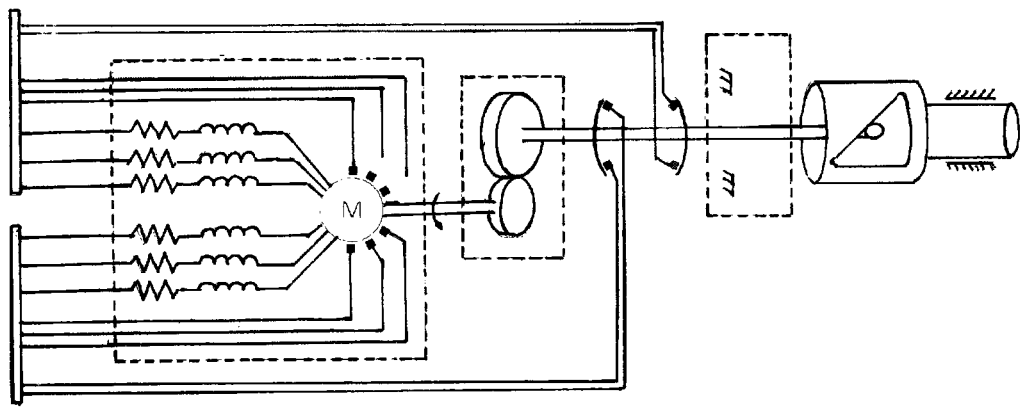
FIG. 14 illustrates schematically the electric circuits of the actuator of FIG. 13.
Figure 15:
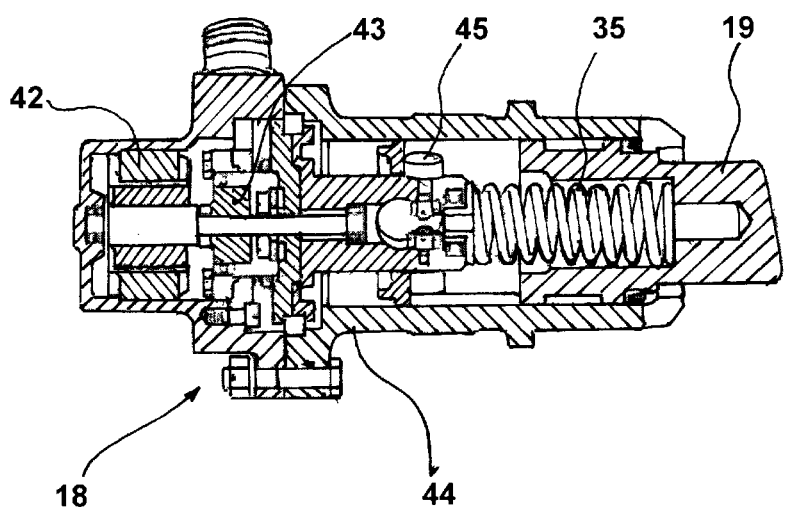
FIG. 15 shows a view in longitudinal section of the actuator of FIG. 13.

The actuation axis of the second rotary actuator 34 is also the rotation axis R2 of the front landing gear 3 (FIG. 9).

The two above-mentioned actuators are provided with respective electric circuits 22, 23 thereby they are supplied with electric current.

The common axis of the pair of wheels 29 and the second cylinder 26 are further connected by a pair of upper 24 and lower 25 articulated levers.

Therefore, in the above-mentioned landing gears, there are two types of actuators installed on the landing gears:
  rotary actuators—one for each landing gear to extend and retract the three landing gear legs;
  locking/releasing linear actuators—one for each landing gear to lock the three landing gear legs.

The system operation sequence shown hereinafter explains the intervention mode of the two types of actuators.

In a normal extension phase, the following procedures are provided:
  releasing of the landing gears from the retracted position to allow the extension thereof;
  extension of the landing gears as far as the wholly extended and mechanically locked position to allow the safe landing of the helicopter,
Said phases are controlled by the control panel 4 by means of the electronic control module 6 with the operating sequence shown hereinafter:
  a) the landing gear is locked in retracted position;
  b) receiving of the extension command;
  c) the electric motors of the rotary actuators are energized and they shift slightly upwards the respective landing gear, to allow the retractable pin 19 to be in a free position with respect to the respective sustaining seat whereupon it rests;
  d) the electric motor of the linear actuators are energized to retract the locking pin 19, by activating then a sensor of retracted pin which keeps such position and controls the landing gear extension;
  e) once received the signal of start lifting the rotary actuators, the power supply to the linear actuators is interrupted and a spring 35 brings back the respective locking pin 19 in wholly extended position;
  f) the retraction rotary actuator brakes the landing gear which extends below its own weight at a controlled speed and braking torque to keep the requested speed;
  g) the landing gear ramp squeezes mechanically the locking pin 19 of the linear actuator until it is exceeded, and the wholly extended locking pin 19 positions in its seat, by locking mechanically the landing gear in wholly extended position;

On the contrary, as far as the retraction phase is concerned, it is constituted by the following procedures:
  releasing of the landing gears from the locked position to allow the retraction thereof;
  retraction in bay as far as the mechanical lock, this phase is controlled by the control panel 4 by means of the electronic control module 6 with the operating sequence shown hereinafter:
i) the landing gear is locked in the wholly extended position;
ii) the landing gear receives the retraction command, but, as far as the front landing gear 3 is concerned, it cannot be retracted until it has self-aligned and it is locked in the central position thereof;
iii) the electric motor of each linear actuator is energized to retract the locking pin at the maximum speed;
iv) when the end-of-stroke sensor of the linear actuator is activated, the actuator stops and keeps the position;
v) the rotary actuators are energized at the maximum speed to retract the respective landing gear;
vi) the start-motion and end-of-stroke signals of the rotary actuators brake the landing gears and control the linear actuator to release the locking pin 19, by allowing the respective landing gear to be locked mechanically in the wholly retracted position; and at last
vii) under emergency conditions, the landing gear extends by fall free from gravity, with the automatic releasing of the locking pin upon ceasing the power supply thereof.

By referring to the rotary actuators, they differentiate between the first one, connected to each landing gear 2, and the second one, associated to the front landing gear 3.

By way of example, the rotary actuators allow a retraction of the landing gears by:
  84°±1° for the main landing gears
  78°±1° for the front landing gear.

The main components of the rotary actuators are: an electric motor 21 with a shaft 41, an arm of the actuator 37, a reduction gear group 38; an outer casing 39 and suitable end-of-stroke sensors 40.

They are responsible for the primary function of extending and retracting the landing gear legs by means of an electronic control.

The above-mentioned speed reduction gear group 38, or torque amplifier, is based upon the concept of harmonic gear and a group of magnetic sensors showing the specific positions of the landing gear for control purposes.

The electric motor 21 is of brushless type and it is suitably fed by using Hall effect sensors. It comprises a rotor whereon there are permanent magnets which produce uniform magnetic fields between the poles and then the excitation flows; and a stator whereon three phases are arranged which are energized by producing, in turn, an electromagnetic field.

The rotor shaft, conducting the magnetic flow, is placed inside a jacket which prevents possible fragments of the magnets from dispersing.

The motor on one side is coupled to a harmonic reduction gear and on the other side to an assembly housing an angular sensor.

The harmonic reduction gear is used to the purpose of making compatible the speed and the motor torque with the load to be moved and it can obtain a transmission ratio of 200:1. The function thereof is that of transmitting the torque to the arm of the actuator which, in turn, transmits the rotary motion to the landing gear for the extension and retraction. It is a very compact device and apart from guaranteeing a high loading capacity, it has the advantage of having a very low friction between the components thereof and a backlash near to zero.

Inside the connector assembly, a sensor is guided in the reduction gear group, by means of an inner shaft, and four additional Hall effect sensors assembled on a printed circuit (PCB) provide an output to the controller of the arm position:
  retracted position—to show that the actuator is in wholly retracted position;
  proximity—to show that the actuator has to slow down as it is near the retracted position.

The motor has a redundant winding as it is intended to extend in free fall.

The locking and releasing linear actuator is mainly an electromechanical device which transforms the rotary motion of an electric motor into the linear motion of the locking pin by means of a rotary cam.

The main components of the linear actuator are a rotary electric motor 42, a reduction gear 43, the retractable locking pin 19, an outer structure 44 interfacing with the landing gear; a cam mechanism 45 and said return spring 35.

The rotation axis of the rotary electric motor 42 of the linear actuator coincides with the linear actuation axis of the locking pin 19 by the effect of the action of the cam mechanism which transforms the actuation of the electric motor from rotary to linear.

The device is equipped with two electric connectors for the related interfaces which communicate the status signals of the landing gear and of the device to the electronic control module 6 and receives the power supply from the helicopter.

In detail, the linear actuator comprises a pair of brushless electric motors with distinct windings, suitably fed by using Hall effect sensors, coupled to a cam mechanism used to convert the motor rotary motion into the linear motion of the pin 19, for the mechanical locking in the extended/retracted positions of the landing gear.

A magnetic sensor provides a signal to the control module 6 when the pin 19 is in wholly retracted position. The motor has a double winding, a main one and an emergency one.

The cam mechanism 45 was sized to produce the wished shifting of the pin 19 with a torque/speed profile to the motor, reasonable even under the worst conditions.

In order to allow the pin extension when the motor power supply is removed, a return spring 35 is used.

Two configuration types are possible:
- retracted locking pin and retracted cam transferor, when power is provided to the motor from the control module, both in case of main motor and emergency one, the motor rotates by retracting the cam transferor which guides backwards the pin, and when it is in wholly retracted position the linear sensor provides a signal to the controller;
- extended locking pin and extended cam transferor, when the power is removed, the compressed spring of the pin is released by bringing back the pin and the cam transferor in the wholly extended position thereof.

The above-described landing gear systems were developed to provide specific technical solutions and related advantages, in particular:
- the development of a landing gear system controlled and actuated in wholly electrical way allowed to eliminate the on-board hydraulic system, the related hydraulic devices for the power distribution and the pressure pipes, by providing a considerable weight saving with respect to a conventional hydraulic system and an overall increase in the aircraft reliability to the advantage of safety;
- the elimination of the hydraulic pipes and, specifically, of the oil contained therein, contributed to reduce the pollution to the advantage of the environment protection;
- as to the technical performances, the invention at issue exploits the "Strain Wave Gearing" (SWG) principle by using harmonic gears available on the market to implement in a very effective way the decrease in the number of revolutions of the electric motor to the advantage of the amplification of the torque values necessary for moving the landing gear legs in the manoeuvres for extending and retracting the same; the motion is produced with electric motors having low consumption and high reliability and performances, available on the market too.

To the above-described landing gear system assembly a person skilled in the art, with the purpose of satisfying additional and contingent needs, could introduce several additional modifications and variants, all however comprised within the protective scope of the present invention, as defined by the enclosed claims.

The invention claimed is:

1. An aircraft landing gear assembly, having a device actuating the landing gear from a retracted position to an extended position and vice versa, and a device for locking and releasing in and from said positions, jointed to an aircraft at a respective hinge point, comprising:
   a rotary actuator acting on the landing gear assembly at said hinge point, having a rotary electric motor connected to an actuating arm, for rotation of the landing gear assembly around a respective actuation axis, through a reduction gear group, with an interconnection so that, in case of power supply failure, the actuator is free to rotate dragged by the landing gear assembly by free fall;
   a linear actuator, integral to the landing gear assembly and movable therewith, which constitutes said locking device and which comprises a rotary electric motor and a cam mechanism to transform a rotary motion of the electric motor into an axial motion of a locking pin according to a respective actuation axis, acting in retraction opposed to a spring which determines the extension thereof in a position for locking the landing gear assembly (1), wherein the actuation axes of the rotary actuator and of the linear actuator are parallel, and wherein the rotation axis of the rotary electric motor of the linear actuator coincides with the linear actuation axis of the locking pin.

2. The landing gear assembly according to claim 1, wherein said linear actuator is assembled on a projecting extension of the landing gear assembly, extending on a plane parallel to a plane defined by the wheels of the landing gear assembly.

3. The landing gear assembly according to claim 1, wherein the reduction gear group of the rotary actuator comprises harmonic gears and Hall effect sensors assembled on a printed circuit providing an output to the controller of the arm position.

4. The landing gear assembly according to claim 1, wherein the rotary actuator comprises a brushless type electric motor fed by using Hall effect sensors, comprising a rotor whereon there are permanent magnets which produce uniform magnetic fields between the poles and then the excitation flows; and a stator whereon three phases are arranged which are energized by producing, in turn, an electromagnetic field.

5. The landing gear assembly according to claim 1, wherein the linear actuator comprises a double winding brushless electric motor, fed by using Hall effect sensors, coupled to a cam mechanism used to convert the motor rotary motion into the linear motion of the locking pin.

6. The landing gear assembly according to claim 5, wherein in the linear actuator a magnetic sensor provides a signal when the locking pin is in wholly retracted position.

7. An aircraft comprising at least one of landing gear assemblies of claim 1.

\* \* \* \* \*